Sept. 23, 1952     H. E. LATOURELLE     2,611,265
MAGNETO TESTER

Filed Feb. 9, 1948                                        4 Sheets-Sheet 1

INVENTOR
HARRY E. LATOURELLE
By Paul, Paul & Moore
ATTORNEYS

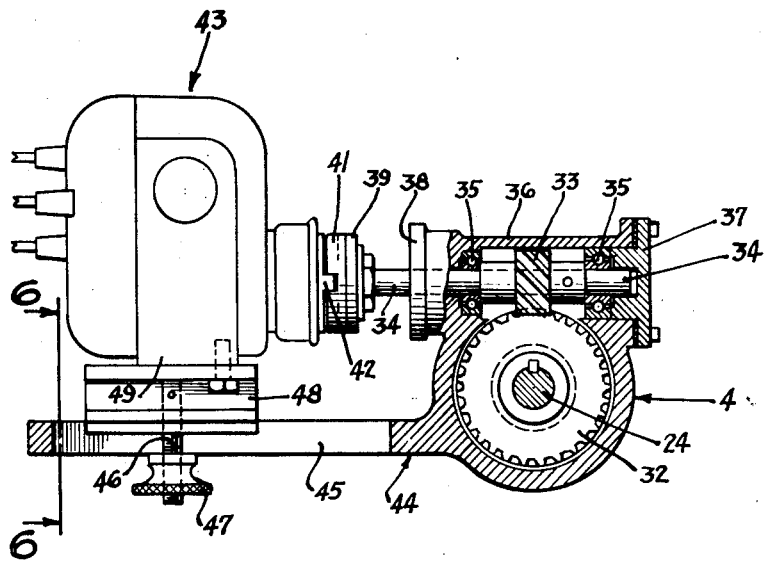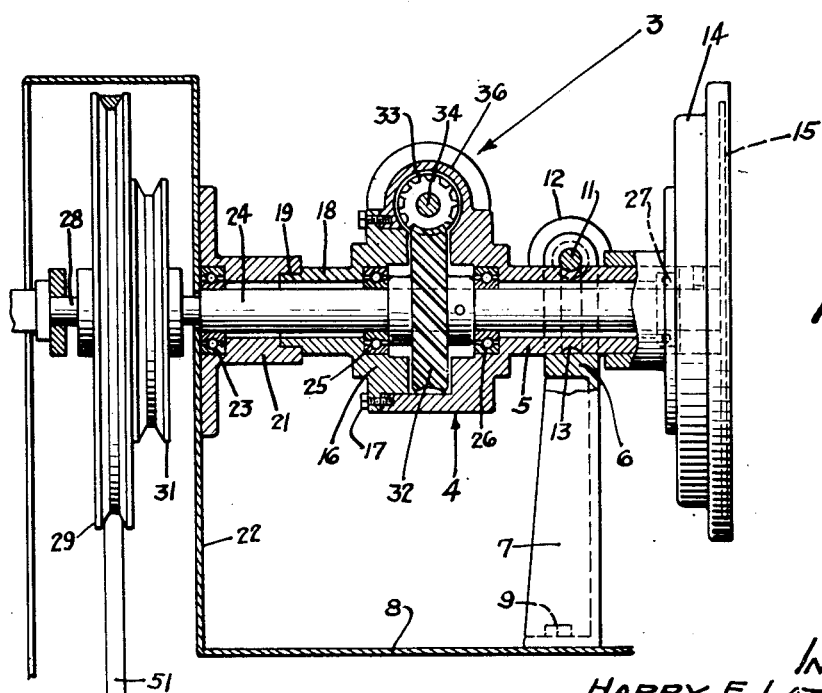

Patented Sept. 23, 1952

2,611,265

UNITED STATES PATENT OFFICE 2,611,265

MAGNETO TESTER

Harry E. Latourelle, Minneapolis, Minn., assignor to Reinhard Brothers Company, Minneapolis, Minn., a corporation of Minnesota Application February 9, 1948, Serial No. 7,221

6 Claims. (Cl. 73—118)

The present invention relates to a magneto tester particularly adapted for testing magnetos when removed from their usual mountings for repairs and the like, and whereby each magneto may be tested while supported in substantially the same position as the position in which it is mounted upon its respective engine.

It is a well known fact that the electrical characteristics of magnetos depend to a large extent upon the particular position in which the magneto is placed at the time of operation. Thus a magneto which develops a requisite type of spark when mounted in one position, may be entirely unsatisfactory when mounted in a different position. Accordingly, it has been found necessary in the adjustment and repair of magnetos to mount them in a test device in the position in which they are mounted on the engine with which they are used, such that the characteristics demonstrated during the test will be the same as the characteristics during actual use.

Magnetos are very commonly mounted in any one of three characteristic positions, one, in which the magneto is supported on its base with its shaft approximately horizontally disposed; the second position, in which the shaft is substantially vertically disposed; and a third position in which the shaft is approximately horizontal, but the magneto is inverted and depends from its support. There may also be instances where the magneto may be mounted at an incline on the engine with which it is used.

In the operation of equipment now customarily used for testing magnetos, it has usually been found necessary to keep on hand a plurality of supports and adapters to provide for supporting each magneto to be tested in substantially the position in which it is supported when in actual use. The apparatus herein disclosed was developed after considerable experimental work in an attempt to produce a magneto tester of simple and inexpensive construction, wherein all of the objectionable features now inherent in such apparatus has been eliminated, and whereby magnetos of various types and sizes may be expeditiously and accurately tested, said apparatus comprising a rotatably adjustable support having means for quickly securing a magneto thereto and coupling it to a suitable driving means, and whereby the magneto, while being tested, may be supported in its normal position and operated as if mounted on its respective engine.

It is therefore an object of the present invention to provide a magneto tester having an adjustable support upon which the magneto to be tested may be conveniently secured, and whereby the magneto may be mounted and tested in a position corresponding to the position in which it is mounted when in actual use or service.

A further and more specific object is to provide a magneto tester comprising a support having means for securing a magneto thereto, said support being mounted for rotary adjustment in a vertical plane to permit positioning the magneto in its normal position while being tested, and said support having a novel drive embodied therein whereby the magneto to be tested may be driven at its rated speed to thereby obtain an accurate test.

Other objects of the invention reside in the arrangement and construction of the magneto mounting whereby the magneto may be quickly secured to said mounting and coupled to the driving means in a minimum of time; in the provision of such an apparatus wherein the magneto being tested is fully exposed to view at all times during the testing operation; and in the provision of a magneto tester which is efficient and accurate in operation, and which is not dependent upon the services of an experienced mechanic for the operation.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 4 is a cross sectional view on line 4—4 of Figure 3;

Figure 5 is a similar view on the line 5—5 of Figure 3; and

Figure 6 is a detail sectional view on the line 6—6 of Figure 5.

Figure 1:
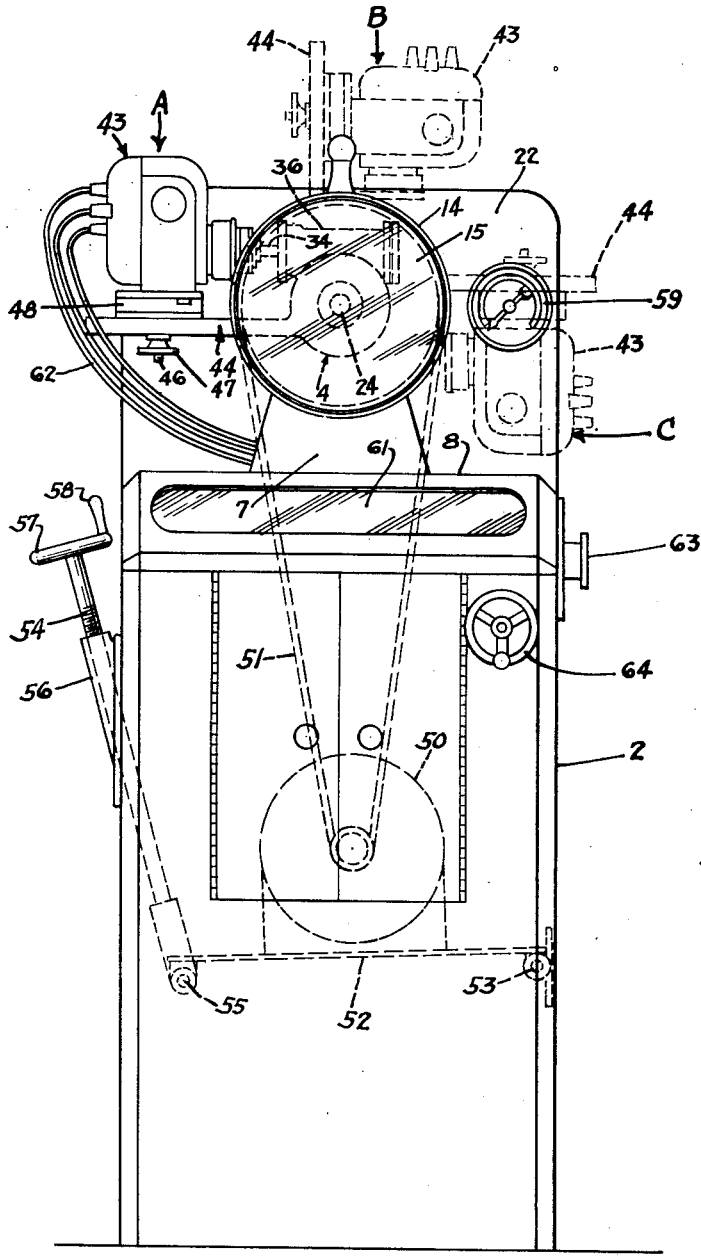
Figure 1 is a front elevation of an apparatus embodying the invention and showing in full lines a magneto secured in position upon the supporting member, the dotted lines indicating other positions of the magneto.
Figure 2:
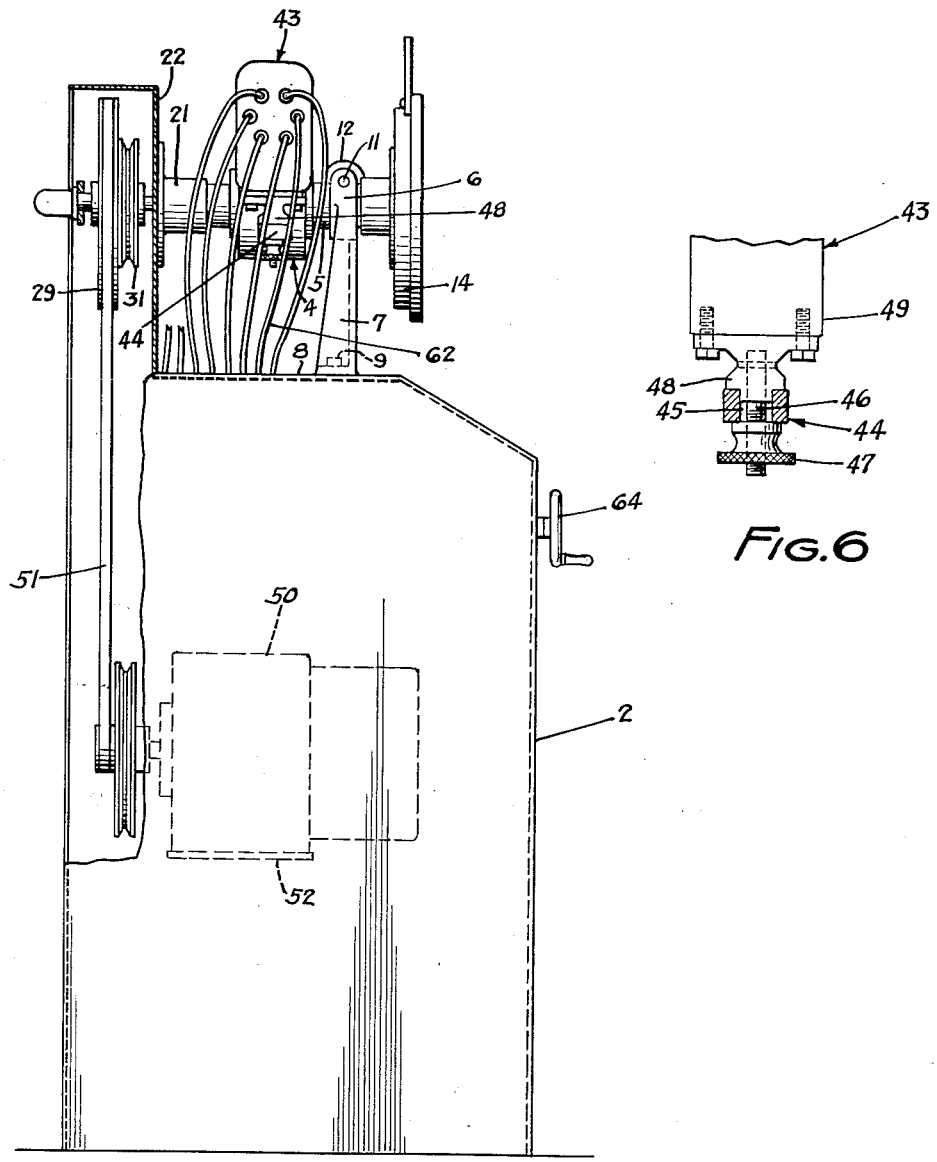
Figure 2 is a side elevation of the apparatus shown in Figure 1, partially broken away to more clearly illustrate the drive connections.

In the selected embodiment of the invention herein disclosed there is illustrated in Figures 1 and 2, for purposes of disclosure, a commercial magneto tester comprising a cabinet or casing 2, which provides a support for various instruments for inspecting and checking the various operating characteristics of a magneto, such as the intensity of the sparks generated by the magneto under varying speeds. The cabinet 2 may, if desired, be mounted upon suitable casters, not shown, to facilitate moving it about from one place to another. The various instruments above referred to form no part of the present invention and it will therefore be unnecessary to herein describe them in detail.

The present invention is directed to a novel mounting means for a magneto to be tested, whereby each magneto may be supported in substantially the identical position in which it is mounted upon its respective engine when in use. Experience has shown that to accurately test the various characteristics of a magneto, when detached from its engine, the magneto should be supported in identically the same position in which it is supported on the engine while running a test thereon.

To thus support the magneto, a novel mounting mechanism, generally designated by the numeral 3, is shown mounted on the upper portion of the cabinet 2 and comprises a gear housing 4 provided at one side with an elongated hub 5 which is received in a split bearing 6 provided at the upper end of a bracket 7, shown secured to the top wall 8 of the cabinet by such means as bolts 9. The bearing 6 may be provided with a clamping screw 11 having a hand grip 12 whereby the screw 11 may be manipulated to lock the hub against rotation in the bearing 6. It is to be understood that the hub 5 is non-rotatably supported in the bearing 6. The periphery of the hub 5 may be annularly grooved as shown at 13 adapted to receive the clamping screw 11, and whereby the hub 5 is locked against relative axial movement in the bearing 6, when the screw 11 is loosened to permit rotatably shifting the position of the housing 4, as will later be described.

A shallow circular housing 14 is shown secured to the outer end of the hub 5 and contains a rotary device, indicated by the numeral 15, which indicates certain characteristics of the magneto as is well known. This device forms no part of the present invention.

Secured at the opposite end of the gear housing 4 is an end cap 16 which is removably bolted thereto by bolts 17. The cap 16 has a hub 18 whose end is reduced as shown at 19 and is received in a counterbore provided in a flanged bracket 21 secured to the wall 22 of an upright housing portion extending upwardly from the top wall 8 of the cabinet at the rear thereof, as shown in Figures 2 and 4. A bearing 23 is shown provided in the bracket 21 and supports one end of a shaft 24, the intermediate portion of which is supported in suitable bearings 25 and 26 mounted in the gear housing 4, as best illustrated in Figure 4. The opposite or forwardly extending end of the shaft 24 may be supported in a similar anti-friction bearing 27 mounted in the end of the hub 5, as indicated in dotted lines in Figure 4.

Extending rearwardly from the bearing 23, the shaft 24 is shown reduced in diameter to provide an extension 28 which traverses the housing 22 and is shown supporting a pair of V-shaped pulleys 29 and 31 which are fixed to the shaft extension 28. The rotary indicating device 15 provided within the circular housing 14 of the magneto tester may be secured to and driven by the shaft 24, as will be understood.

A worm gear 32 is fixedly secured to the power shaft 24 within the housing 4 and is shown meshing with a worm 33 secured to a magneto drive shaft 34 mounted in suitable bearings 35 supported in a tubular portion 36 of the gear housing 4. An end cap 37 may be secured to one end of the tubular housing portion 36, as shown in Figure 5.

The shaft 34 extends through an opening in the end wall 38 of the tubular housing portion 36, and is shown provided with a suitable coupling member 39 adapted to interlock with a coupling member 41 which in turn is interlocked with the usual coupling member 42 of the magneto 43, to be tested.

The magneto is adjustably secured in position for coupling to the shaft 34 by a laterally extending bracket 44 which may have one end integrally formed with the gear housing 4, as best shown in Figure 5. The bracket 44 is longitudinally slotted, as shown at 45 in Figure 5 to receive a clamping screw 46 having a clamping nut or member 47 received in threaded engagement therewith and having its upper end operatively secured to a base member or adapter 48 whereby the member may be securely fixed to the bracket 45 by manipulation of the hand wheel 47, as shown in Figure 6. The base 49 of the magneto is seated upon the base of the adapter 48 and is suitably secured thereto whereby the magneto becomes a component part of the assembly, illustrated in Figure 5.

Power for driving the magneto may be obtained from a convenitonal motor 50 through a V-belt 51, as shown in Figures 1 and 2. The motor is shown mounted upon a platform 52 hinged at 53 to a wall of the cabinet 2. The opposite end of the platform 52 is pivotally connected to the lower end of an adjusting rod 54, as indicated at 55 in Figure 1. The rod 54 may be threadedly supported in a suitable guide 56 and is provided at its upper end with a hand wheel 57, shown provided with a crank 58 whereby the rod 54 may be conveniently rotated to raise or lower the platform 52 to thereby vary the tension in the belt 56.

To accurately test a magneto, the various operating characteristics of the magneto must be carefully observed while the magneto is operating under conditions simulating, so far as possible, the operating conditions of the magneto when in actual use in the field. This therefore requires a careful observance of the electrical characteristics of the magneto which may be noted upon the member 15 in the casing 14; the intensity of the sparks generated by the magneto rotor at varying speeds must also be noted, and may be observed through the glass panel 61, beneath which the usual electrodes 60 and 60' are located, as indicated in Figure 3, and to which the usual leads or conductors 62 of the magneto are connected in the usual well known manner.

An adjusting element 63 is shown mounted exteriorly of the casing 2 to provide means for varying the gap between the electrodes 60 and 60' during the operation of a test run. The tachometer 59, mounted on the rear upright wall 22 of the cabinet, indicates to the operator the speed at which the magneto shaft is rotating. Another control element 64 is shown located on the front wall of the casing 2, directly below the panel 61 adjacent one corner of the casing.

Figure 3:
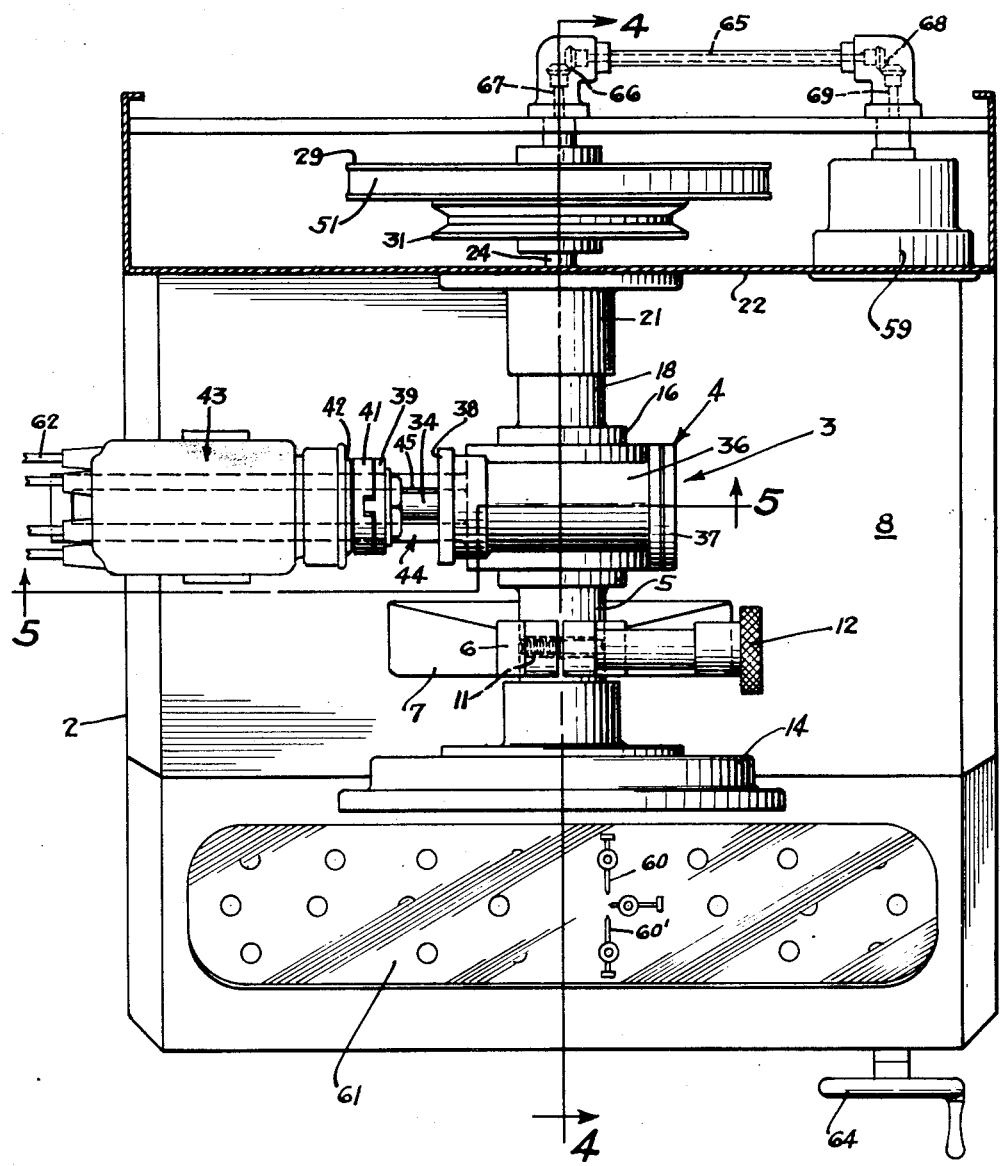
Figure 3 is a plan view of the apparatus shown in Figures 1 and 2.

The tachometer 59 may be driven from the power shaft 24 through a shaft 65 having one end connected by miter gears 66 to a shaft extension 67 which may be operatively connected to the power shaft 24, and similar miter gears 68 connect the opposite end of the shaft 65 to the tachometer shaft 69, as clearly illustrated in Figure 3.

The outstanding feature of the present invention resides in the unique mounting of the supporting bracket 44 for the magneto 43. This bracket is fixed to the gear housing 4 whereby when a magneto is secured to the bracket 44, the bracket 44, magneto 43 and gear housings 4 and 36, become fixed with relation to one another, whereby they may be rotatively adjusted as a unit about the axis of the power shaft 24, when the hub 5 is released from the bracket 7 by manipulation of the hand wheel or knob 12, shown in Figure 3.

In other words, if the magneto is mounted for horizontal operation when in actual use, it will be positioned in the tester, as shown at A in Figures 1 and 5; and should the magneto be mounted upon the engine with its shaft vertically disposed, the bracket 44 will be adjusted to the vertical position indicated in the dotted line position B in Figure 1; and if the magneto is mounted on the engine in an inverted position, it will be mounted upon the tester as indicated by the dotted line position C, in Figure 1, wherein the bracket 44 is positioned in diametrically opposed relation to the position shown in full lines in Figure 1, except at a slightly higher elevation, as will be understood by reference to the drawings.

The slot 45 in the bracket 44 provides means whereby magnetos of various sizes may be supported upon the mounting. It will also be noted that the supporting arm on bracket 44 for the magneto is rotatably adjustable about the axis of the power shaft 24, whereby the magneto may be operated in any position within the adjustable range of the supporting arm 44.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

What I claim is:

1. The combination with a magneto tester having means embodied therein for indicating the various operating characteristics of a magneto, of a housing having opposed cylindrical bearing surfaces, fixed bearing elements rotatably receiving said bearing surfaces whereby the housing may be rotatably adjusted in said bearing elements, means for securing the housing in adjusted position, a power shaft in said housing having means at one end for connecting it to a source of power, a driven shaft also mounted in said housing and having a driving connection with said power shaft, a laterally extending arm on said housing disposed in substantially parallel relation to said driven shaft, and means on said arm for adjustably securing a magneto in position thereon with its shaft drivingly connected to said driven shaft, and whereby the magneto may be driven from the power shaft, thereby to test the operating characteristics of the magneto, the adjustable mounting of said housing permitting the magneto to be mounted in the apparatus in its normal operating position.

2. A magneto tester according to claim 1, wherein the driven shaft is driven from the power shaft by a pair of worm gears.

3. The combination with a magneto tester having means embodied therein for indicating the various operating characteristics of a magneto to be tested therein, of a housing having opposed cylindrical end portions, fixed bearing elements rotatably receiving said cylindrical end portions whereby the housing may be rotatably adjusted in said bearing elements, a power shaft mounted within said housing and having means at one end for connecting it to a suitable source of power, a driven shaft also mounted in said housing and disposed at substantially right angles to said power shaft, spiral gears interconnecting said shaft for simultaneous rotation at different speeds, a supporting arm having one end secured to said housing and extending laterally therefrom in substantially parallel relation to said driven shaft, a block slidably supported on said arm and having means for securing it thereto in adjusted position, means whereby a magneto to be tested may be secured to said block with its shaft substantially axially aligned with said driven shaft, and a coupling element secured to said driven shaft adapted for interlocking engagement with the magneto shaft, whereby the magneto may be driven from the power shaft, the adjustable mounting of said housing and supporting arm permitting the magneto to be mounted in the apparatus in its normal operating position.

4. In combination with a magneto tester comprising a casing having a top wall and an upright wall portion extending upwardly from said top wall, of a horizontally disposed bearing element secured to said upright wall portion, a pedestal mounted on said top wall and having a bearing element at its upper end axially aligned with said horizontally disposed bearing element, a housing having opposed cylindrical end portions rotatably received in said bearing elements, means for locking the housing against relative rotation in said bearing elements, a power shaft mounted in said housing and having one end extending through said upright wall portion and provided with means for connecting it to a source of power, a driven shaft mounted in the upper portion of the housing and having a driving connection with the power shaft, a supporting arm having one end fixed to the housing and extending outwardly therefrom, a block mounted for longitudinal sliding movement on said arm and having means for securing it thereto in adjusted position, means on said block for securing a magneto thereto with its shaft aligned with said driven shaft, means for coupling the magneto shaft to said driven shaft for direct rotation therewith, the rotary mounting of said housing in said bearing elements permitting the housing, supporting arm, and the magneto secured to said arm to be relatively rotated as a unit about the axis of the power shaft to position the magneto in its normal operating position, thereby to facilitate accurately testing the various operating characteristics of the magneto.

5. A magneto tester according to claim 4, wherein the bearing element at the upper end of said pedestal is split, and a clamping screw is received in threaded engagement with a portion of said split bearing element whereby it may be contracted to secure the housing in adjusted position, rotatively.

6. A magneto tester according to claim 5, wherein the cylindrical end portion of the housing received in said split bearing element is provided with a circumferential groove adapted to receive a portion of said clamping screw, whereby said screw also functions to secure the housing against relative movement in a direction axially of said bearing elements.

HARRY E. LATOURELLE.

REFERENCES CITED

The following references are of record in the file of this patent:

UNITED STATES PATENTS

| Number | Name | Date |
| --- | --- | --- |
| 1,008,753 | Sundstrand | Nov. 14, 1911 |
| 1,397,296 | Schaf et al. | Nov. 15, 1921 |
| 1,445,923 | Wilder | Feb. 20, 1923 |
| 1,470,091 | Michelson | Oct. 9, 1923 |
| 2,460,676 | Casper | Feb. 1, 1949 |